United States Patent [19]
Krstic et al.

[11] Patent Number: 5,443,770
[45] Date of Patent: Aug. 22, 1995

[54] HIGH TOUGHNESS CARBIDE CERAMICS BY SLIP CASTING AND METHOD THEREOF

[76] Inventors: Vladimir D. Krstic, Queen's University, Department of Materials and Metallurgical Eng.; Lanyin Zhang, Queen's University, Department of Materials and Metallurgical Eng., Nicol Hall, both of Kingston, Ontario, Canada, K7L 3N6

[21] Appl. No.: 123,916

[22] Filed: Sep. 20, 1993

[51] Int. Cl.$^6$ .............................................. C04B 33/28
[52] U.S. Cl. ...................................... 264/60; 264/86
[58] Field of Search ..................................... 264/60, 86

[56] References Cited

U.S. PATENT DOCUMENTS 3,383,444  5/1968  Loyet .................................... 264/60
4,521,355  6/1985  Kitojima ............................... 264/60

FOREIGN PATENT DOCUMENTS 4-89202  3/1992  Japan ..................................... 264/60

OTHER PUBLICATIONS

Ceramic Bulletin, vol. 61, No. 12 (1982) pp. 1315–1318 "Stresses in Ceramic/Ceramic Composites Formed by Two–Step Drain Casting", Nabil Abdelsalam Haroun.

Primary Examiner—James Derrington

[57] ABSTRACT

Modified slip casting technique is used to manufacture a layered-ceramic structures having alternate layers of ceramics and carbon. The resulting layered structure has a density of over 95% of its theoretical density, fracture toughness of over 19,7 MPa.m$^{\frac{1}{2}}$ and fracture strength of over 400 MPa.

8 Claims, No Drawings

HIGH TOUGHNESS CARBIDE CERAMICS BY SLIP CASTING AND METHOD THEREOF

FIELD OF INVENTION

The present invention relates to a single phase ceramic layered structure separated by a weak inorganic interface. More specifically the invention relates to a multiple layers of ceramics produced by slip casting and bonded by a small amount of inorganic, non-reacting substances such as carbon. The layered structure is substantially a single phase material with fracture toughness one order of magnitude higher than that of a constituent phase alone. So produce articles are useful in situations involving high impact loads and requiring high fracture toughness. loads and requiring high fracture toughness.

BACKGROUND OF THE INVENTION

Ceramic materials are well known for their unique combination of properties such as high hardness and strength, corrosion and erosion resistance, and excellent high temperature properties. However, due to their low fracture toughness, their use to date has been limited to cases where fracture toughness is not the requirement.

The strive to increase fracture toughness has led to the development of various methods for toughening of ceramics. The most widely used method of toughening involves impregnating the matrix with fibres and sintering at high temperature to eliminate porosity. There are two major problems associated with this method. First the strong ceramic fibres used for reinforcement are relatively very expensive and their handling requires extreme care. Second, incorporation of fibres into ceramic matrix is relatively very complicated, making the entire process commercially uncompetitive, particularly for mass production.

Another method of toughening ceramics [Nature Vol.347, p.455 (1990), Proceedings of the 4th International Conference on Fibre Reinforced Composites, Edited by G. Gibson, Institute of Mechanical Engineering, pp.179, Liverpool, (1990)] involves creation of weak interfaces capable of deflecting the crack and thus changing the mode of fracture from Mode I to Mode II. The method consists of mixing the ceramic powder with 30 to 40% by volume of aqueous polymer solution, rolling the mix into thin laminae and subsequent pressureless sintering to achieve densification. The layer structure is produced by compacting together, in a green state, thin sheets of ceramics separated by thin graphite layers. The ceramic bodies produced with this method exhibit fracture toughness in excess of 17 MPa.m$^{\frac{1}{2}}$. There are two major problems associated with this technique. First, the polymeric substance used in this process is difficult to mix with ceramic powder and thus requires special mixing equipment. Second, in order to avoid cracking of the green bodies, the removal of the polymeric binder is a very slow process, requiring long thermal cycles, normally days or even weeks.

It would be an improvement in the art if high toughness ceramic laminated structures can be produce without the use of polymeric component and employing simpler processing techniques such as slip casting.

SUMMARY OF THE INVENTION

The present invention relates to an article having one order of magnitude higher fracture toughness as compared to the individual components, which article comprises:

a) a layered ceramic structure consisting of alternating layers of ceramics carbide and carbon, which layers do not contain polymeric binders.

The present invention also relates to a slip casting method to produce layered structure of ceramics, which method comprises:

b) mixing ceramic powders with water and with suitable sintering aids; (b) mixing of fine carbon powder with water to form a dilute solution of carbon in water: (c) slip casting alternating layers of ceramics and carbon in a suitable mould, preferably plaster of paris mould: (d) drying the green body at 100° C. to remove water; and (e) sintering of a green body to achieve densification.

DETAILED DESCRIPTION OF THE INVENTION

As used herein:

"Carbide ceramics" includes those inorganic compounds and materials which have or produce on heating ceramic properties. Examples of carbide ceramics include, but not limited to all transition metal carbides and mixtures there of. Transition metal carbide are defined, for the purpose of this invention as carbides of the elements which have unfulfilled d-orbitals. These elements are: Ti, V, Cr, Mn, Mg, Y, Zr, Hf, Nb, T, Mo, W, La, Ce, B and Si.

A slurry includes, but is not limited to, a mixture of solid ceramic particles and a liquid. Examples of liquids include, but are not limited to water, organic and inorganic binders, lubricants, defoamers and defloculants, or mixtures thereof.

A method is invented to make a novel ceramic material having a fracture toughness greater than 19.7 MPa.m$^{\frac{1}{2}}$ and strengths greater than 400 MPa. The method involves slip casting thin ceramic layers and thin layers of carbon to form multiple layer structure composed of alternate layers of ceramics and carbon. The major advantage of the present invention is that it uses a simple and inexpensive slip casting technique to fabricate tough ceramic structures without having to use organic binders or fibres.

There are various ways of toughening ceramic matrices. The most widely used methods are those involving the incorporation of an obstacle for crack propagation, or providing a weak interface along which a crack is forced to propagate. It is well known in the art that this type of crack propagation changes the mode of fracture, lowers the stress concentration at the crack tip, and enhances fracture toughness. The best known systems of this type are fibre composites. Although very effective in toughening of ceramic matrices, fibre composites are very complex to manufacture and relatively very expensive. It is the object of the present invention to overcome the above mentioned difficulties inherent to conventional fibre composite fabrication processes and to provide a new process for toughening ceramics, whereby a high toughness is readily obtainable by providing a weak carbon interface and a strong and stiff ceramic layers. The layered structure is then heated to high temperature to achieve densification.

It has been discovered in the present invention that the continuous ceramic layers, ranging in thickness between about 50 and about 1000 micrometers, and thin carbon layers ranging in thickness from about 1 micrometer to about 20 micrometers, can be produced by slip casting technique. In this process, the weak interface required for crack deflection is provided by the carbon-layers.

In a conventional slip casting process, the major problem associated with casting of alternate layers of ceramics and carbon particles is the interpenetration of ceramic particles into carbon layers and carbon particles into ceramic layers which occurs regularly during the green body solidification. It has been found in the present invention that this problem can be eliminated entirely if the layers are dried quickly. The time required to dry the slip cast layer depends on the thickness of the layer and on the amount of liquid present in the slurry. Depending on the layer thickness, the time required for the slip to dry can vary from about five seconds to about ten minutes. It was also found that, although the drying time for the slurry and the concentration of the particles in the slurry, are interdependent, short drying times and high concentration of particles in the slurry normally produce layers of better uniformity in thickness.

The preparation of slurry for slip casting is achieved by mixing the submicron size ceramic powders with water in proper proportion so as to achieve the desirable slip viscosity. The volume ratio between the ceramic powders and water is in the range between about 1 and about 4, preferably between about 1 and about 1.8 to 2.3. "The ceramic slurry can consist essentially of about 5 percent to about 40 percent by weight of ceramic particles having a size of about 0.1 to about 5 micrometers and about 95 percent to about 60 percent by weight of a liquid".

Higher ceramics to water ratios are desirable from the densification view point, however, too high a ratio normally cause the development of porosity and problems during drying.

Mixing of ceramic powders with water to form a slip casting slurry can be achieved by a number of conventional techniques such as, for example, attrition milling, ball milling or any other milling technique.

Similarly, carbon slurry used to slip cast the carbon layers is made by mixing the submicron size carbon particles and water. The concentration of carbon particles in the slurry may vary from about 2 to about 10% by weight, preferably from about 5 to about 8% by weight. "Consequently, the amount of water in the slurry may vary from about 99% by weight to about 90% by weight." Carbon powder should have a particle size in the range from about 0.1 to about 5 micrometers, preferably less than one micrometers. Carbon precursors in any chemical form may be used instead of elemental carbon. Slip casting may be performed by conventional techniques such as pouring ceramics and carbon layers alternately into the suitable mould cavity, followed by 1 to 10 minutes of drying at an ambient temperature to allow the slip to solidify. The mould used for slip casting is readily available plaster of paris mould which has a desirable shape. The wet slip casted body may be dried by conventional techniques (e.g. air drying). Any lubricants organic or inorganic, binders or similar additives used to adjust slurrry viscosity may be used. An alternative method of intensifying the drying procedure is to heat the slurry to temperatures above ambient, normally above 60° C. to evaporate the water. Vacuum can also be used to speed up the evaporation of the water, although too fast a drying may cause fracture of the cake. The advantage of the present invention is that a standard, commercially viable slip casting technique is used to form wide variety of sample shapes and sizes.

The thickness of each individual layer depends on the amount of slurry poured into the mould. Thicker layers are formed by pouring larger amount of slurry followed by longer drying. In accordance with the present invention, ceramic layers ranging in thickness from about 0.01 mm to about 1 mm and carbon layers ranging in thickness from about 1 to about 20 micrometers can readily be made. The thickness of the ceramic and carbon layers both influence the fracture toughness of the sintered body. The highest toughness is achieved with ceramic layers ranging from about 100 micrometers to about 400 micrometers in thickness, and with carbon layers ranging from about 3 micrometers to about 15 micrometers in thickness.

The mechanical strength is also controlled by the ceramic layer thickness and carbon layer thickness. For example, the higher the ceramic layer thickness and the smaller the carbon layer thickness, the higher is the strength. The highest strength of over 400 MPa is achieved with structures having ceramic layer thickness of about 600 micrometers and carbon layer thickness of about 3 to 5 micrometers.

As will be recognized by those skilled in the art, the thickness of each individual layer may be adjusted based on the toughness and strength level desired. If high toughness is desired the thickness of ceramic layer would be low and the thickness of carbon layer would be high. If high strength is desired the thickness of ceramic layers would be high and the thickness of the carbon layers would be low.

Sintering of dried slip casted bodies can be accomplished in conventional carbon resistance furnace or induction heated furnace. The sintering temperature can very from about 1860° C. to about 2050° C., depending on the type of ceramics used and on the nature and the amount of sintering aides added to the mix.

In the following, the present invention will be explained with reference to the non-restrictive examples.

EXAMPLE 1

Silicon carbide powder (830 g.,) having an average particle size of 0.3 to 0.4 μm, alumina $Al_2O_3$ (87 g. Alcan SG-16) and $TiO_2$ (25 g,) were thoroughly mixed, with 70% by volume of distilled water. The ready made slurry was stored in a closed plastic bottle for slip casting.

Graphite slurry was made by mixing a synthetic graphite powder (5 g, Aldrich Chemical Co.), and distilled water (97.5 g).

The casting was performed in a Plaster of Paris mould with a gypsum to water ratio of 1 to 1.5. The mould was cast into a wooden framework and dried in air for 3 days before use.

The alternate layers of SiC and graphite were either slip casted by pouring the fixed amount of the slurry into the mould and allowing the slurry to dry, or spraying the slurry for a certain period of time to achieve the desired thickness of the layer. For example, spraying for 10 seconds gives SiC layer thickness of 800 micrometers.

The graphite layers were formed in the same way as with SiC layers, after the water in the SiC layer was drained away by capillary action of the gypsum mould.

The green sample was dried with the mould for 2 days and then taken out from the mould and put into an oven at temperatures between 30° C. and 180° C. for further drying.

The dried green piece with dimensions 100×50×6 mm was sintered in a graphite resistance furnace (Astro Co.) at 1960° C. for 20 min.

Density measurements performed on sintered samples have shown the samples to have the density between 96% and 98% of its theoretical density, shrinkage of 18%, and weight loss of 4%.

Four point bend specimens with dimensions 40×3×4 mm³ were cut and their strength measured. Fracture toughness testing was done on notched samples of the same dimensions. For this set of samples, the average four point bend strength was 250 MPa and the average fracture toughness was 9.5 MPa.M$^{\frac{1}{2}}$. Optical and SEM observations revealed that the layers were uniform in thickness.

EXAMPLE 2

The slurries used in this example were produced in the same way as in example 1 but the thickness of the layers was varied. The first SiC layer was 500 micrometers thick and the subsequent SiC layers were 300 micrometers thick. The graphite layers were kept at about 10 micrometers in thickness. The sintering was done as in Example 1. The final sample strength was 380 MPa and toughness was 13 MPa.m$^{\frac{1}{2}}$. The SiC and graphite layers were uniform in thickness.

EXAMPLE 3

Silicon carbide powder (830 g) having an average particle size of 0.3 to 0.4 micrometers, aluminum oxide powder (87 g) and TiO$_2$ powder (25 g) were mixed with 75% by volume of distilled water and thoroughly mixed as in example 1.

The graphite powder (38 g) was added to distilled water (97.5 g) and thoroughly mixed as in example 1. The first SiC layer was slip casted with a thickness of 200 micrometers and the graphite layer was kept at the same thickness of 4 micrometers. Each subsequent SiC layer was casted with a thickness of 120–130 micrometers. The sintering and sample testing were performed as in example 1. The measured four point bend strength was 400 MPa and the measured fracture toughness was 12 MPa.m$^{\frac{1}{2}}$.

EXAMPLE 4

Silicon carbide powder (830 g), alumina powder (87 g), and titanium oxide powder (25 g) were thoroughly mixed as in example 1. The slip casting was done such that the thickness of the silicon carbide layers was varied from about 150 micrometers to about 600 micrometers and that of the graphite layers was varied from about 5 micrometers to about 17 micrometers. The sintering was done as in example 1.

The measured fracture toughness was 19.7 MPa.m$^{\frac{1}{2}}$ and the measured strength was 380 MPa.

EXAMPLE 5

Boron carbide powder (396 g) having an average particle size of 0.3 to 1.0 micrometers were thoroughly mixed with 1% by weight of carbon powder having an average particle size of less than 0.1 micrometer.

The graphite slurry was made as in example 1.

The slip casting was done such that the thickness of the boron carbide was varied from about 100 to about 600 micrometers and the graphite layer thickness was varied from one micrometer to 20 micrometers. The sintering was done as in example one at temperature between 2200° C. and 2300° C.

The measured fracture toughness was minimum 12 MPa.m$^{\frac{1}{2}}$ and the measured fracture strength was minimum 350 MPa.

While only a few embodiments of the invention have been shown and described herein, it will become apparent to those skilled in the art that various modifications and changes can be made in the layered ceramics articles and the method to produce the layered ceramic article without departing from the spirit and scope of the present invention. All such modifications and changes coming with the scope of the appended claims are intended to be carried out thereby:

We claim:

1. A method of producing a layered structure comprising, which method comprises:
   (a) forming a ceramic slurry consisting essentially of about 5 percent to about 40 percent by weight of ceramic particles having a size of about 0.1 to about 5 micrometers and about 95 percent to about 60 percent by weight of a liquid;
   (b) forming a carbon slurry consisting essentially of about 1 to about 10 percent by weight of carbon particles having a size of about 0.1 to about 5 micrometers and about 99 percent to about 90 percent by weight of a liquid;
   (c) slip casting by pouring or spraying the ceramic and carbon slurries alternately into a slip casting mould to produce a layered ceramic structure having ceramic layers with a thickness of from about 50 to about 1000 micrometers and carbon layers with a thickness of from about 1 to about 20 micrometers;
   (d) drying the layered ceramic structure in air or under vacuum at temperatures of about 30° C. to about 180° C. to produce a green body;
   (e) firing the green body at high temperature, so as to produce a resultant sintered layered body having a fracture toughness of over 19.7 MPa.M$^{\frac{1}{2}}$ and fracture strength of over 300 MPa.

2. The method of claim 1 wherein in the step (a) the ceramic particles are transition metal carbides or mixtures thereof selected from the group of transition metals consisting of Ti, V, Cr, Mn, Mg, Si, B, Y, Zr, Nb, Ta, Mo, W, Hf, La and Ce.

3. The method of claim 1 wherein in step (a) the liquid is a water.

4. The method of claim 1 wherein in step (a) the liquid is a mixture of water and an organic or inorganic binder, dispersant lubricant or combination thereof.

5. The method of claim 1 wherein in step (b) the liquid is a water.

6. The method of claim 1 wherein in step (b) the liquid is a mixture of water and an organic or inorganic binder, lubricant, dispersant or combination thereof.

7. The method of claim 1 wherein the layer structure produced in step (c) has improved resistance to impact loads and improve strain to failure properties.

8. The method of claim 1 wherein the ceramic and carbon slurries are sprayed into the slip casting mould.

* * * * *